US011440257B2

(12) United States Patent
Choi et al.

(10) Patent No.: US 11,440,257 B2
(45) Date of Patent: Sep. 13, 2022

(54) THREE-DIMENSIONAL PRINTING APPARATUS USING DLP PROJECTOR WITH LASER SCANNER

(71) Applicant: HYVISION SYSTEM INC., Seongnam-si (KR)

(72) Inventors: Doo Won Choi, Incheon (KR); Jun Seok Seo, Seongnam-si (KR)

(73) Assignee: HYVISION SYSTEM INC., Seongnam-si (KR)

( * ) Notice: Subject to any disclaimer, the term of this patent is extended or adjusted under 35 U.S.C. 154(b) by 378 days.

(21) Appl. No.: 16/497,621

(22) PCT Filed: Apr. 14, 2017

(86) PCT No.: PCT/KR2017/004046
§ 371 (c)(1),
(2) Date: Sep. 25, 2019

(87) PCT Pub. No.: WO2018/186515
PCT Pub. Date: Oct. 11, 2018

(65) Prior Publication Data
US 2021/0107226 A1    Apr. 15, 2021

(30) Foreign Application Priority Data

Apr. 6, 2017  (KR) .......................... 10-2017-0044739

(51) Int. Cl.
*B29C 64/268* (2017.01)
*B33Y 30/00* (2015.01)
(Continued)

(52) U.S. Cl.
CPC ........ *B29C 64/268* (2017.08); *B23K 26/0869* (2013.01); *B23K 26/342* (2015.10);
(Continued)

(58) Field of Classification Search
CPC ..... B29C 64/268; B29C 64/20; B29C 64/393; B29C 64/277; B29C 64/282;
(Continued)

(56) References Cited

U.S. PATENT DOCUMENTS 11,104,117 B2 *   8/2021   El-Siblani ............. B29C 64/255
2017/0326786 A1 * 11/2017   Yuan ..................... B29C 64/135
2018/0290395 A1 * 10/2018   Gold ....................... B22F 10/20

FOREIGN PATENT DOCUMENTS

CN    105635705 A    6/2016
CN    105665701 A    6/2016
(Continued)

OTHER PUBLICATIONS

Communication dated Nov. 3, 2020, issued by the Chinese Patent Office in counterpart Chinese Application No. 201780088088.9.
(Continued)

*Primary Examiner* — Joseph S Del Sole
*Assistant Examiner* — Lawrence D. Hohenbrink, Jr.
(74) *Attorney, Agent, or Firm* — Sughrue Mion, PLLC

(57) ABSTRACT

The present invention relates to a three-dimensional printing apparatus using a digital light processing (DLP) projector with a laser scanner, the apparatus comprising: a resin storage unit storing a photocurable resin; a DLP projector unit projecting light to the resin storage unit; a molding stage unit provided to be capable of being lifted and lowered in a vertical direction from a bottom of the resin storage unit; a laser scanner unit performing scanning of light for the resin storage unit; a scanner transfer unit allowing the laser scanner unit to move in an x-axis direction; an image processing unit dividing one sectional image of a sculpture into a core portion and a shell portion; and a controller receiving data on the core portion and the shell portion from the image processing unit, controlling the DLP projector, the
(Continued)

laser scanner unit, the scanner transfer unit, and the molding stage unit.

6 Claims, 9 Drawing Sheets

(51) Int. Cl.
*B33Y 50/02* (2015.01)
*B23K 26/342* (2014.01)
*B29C 64/20* (2017.01)
*B29C 64/393* (2017.01)
*B23K 26/08* (2014.01)
*B23K 26/082* (2014.01)
*B23K 103/00* (2006.01)
*B29C 64/277* (2017.01)
*B29C 64/282* (2017.01)
*B29C 64/286* (2017.01)

(52) U.S. Cl.
CPC ............ *B29C 64/20* (2017.08); *B29C 64/393* (2017.08); *B33Y 30/00* (2014.12); *B33Y 50/02* (2014.12); *B23K 26/082* (2015.10); *B23K 26/083* (2013.01); *B23K 2103/42* (2018.08); *B29C 64/277* (2017.08); *B29C 64/282* (2017.08); *B29C 64/286* (2017.08)

(58) Field of Classification Search
CPC ....... B29C 64/286; B33Y 30/00; B33Y 50/02; B23K 26/342; B23K 26/0869; B23K 26/082
USPC .......................................................... 425/162
See application file for complete search history.

(56) References Cited

FOREIGN PATENT DOCUMENTS

| | | |
|---|---|---|
| CN | 205601188 U | 9/2016 |
| JP | 2002-316363 A | 10/2002 |
| JP | 2010-64348 A | 3/2010 |
| KR | 10-1504419 B1 | 3/2015 |
| KR | 10-1533374 B1 | 7/2015 |
| KR | 10-2016-0144837 A | 12/2016 |
| KR | 10-1682087 B1 | 12/2016 |

OTHER PUBLICATIONS

International Search Report for PCT/KR2017/004046 dated Nov. 22, 2017 [PCT/ISA/210].

Communication dated Jul. 5, 2021, issued by the Chinese Patent Office in counterpart Chinese Application No. 201780088088.9.

\* cited by examiner

THREE-DIMENSIONAL PRINTING APPARATUS USING DLP PROJECTOR WITH LASER SCANNER

CROSS REFERENCE TO RELATED APPLICATION

This application is a National Stage of International Application No. PCT/KR2017/004046 filed Apr. 14, 2017, claiming priority to Korean Patent Application No. 10-2017-0044739, filed Apr. 6, 2017.

BACKGROUND OF THE INVENTION

Field of the Invention

The present invention relates to a three-dimensional printing apparatus using a digital light processing (DLP) projector with a laser scanner. More specifically, the present invention relates to a three-dimensional printing apparatus using a DLP projector with a laser scanner generating a core-shell photopolymerizable sculpture by applying a composite optical engine.

Description of the Related Art

Various methods are available in technologies to form a three-dimensional structure, the methods including: a method of extruding and laminating thermoplastics; a method of forming a three-dimensional structure by radiating a laser beam into a vat containing a liquid photocurable resin and radiating a laser again into the vat that is lowered downward by a thickness of the layer whenever a sculpture in the vat is made of one layer; a method of forming a three-dimensional structure by curing a layer of resin on top of another while radiating light of a shape to be formed into a liquid photocurable resin (resin that cures upon receiving light); a method of forming a three-dimensional structure by extruding, from a nozzle of a printer head, liquid color ink and a curing material (binder) onto a powder raw material using an inkjet printer principle; a method of sintering metal powder directly by laser without a binder; and the like.

Among the above methods, a stereolithography printer has an advantage of producing very sophisticated prints with good surface quality. However, to cover a large area to form a large three-dimensional sculpture, a plurality of DLP projectors or xy laser scanners are to be used or DLP projectors, xy laser scanners, or resin reservoirs are to be moved in the x- or y-axis direction. According to above-mentioned conventional stereolithography apparatus, there is a problem that an alignment process for correcting a tilt, position, and size of the projected image of the DLP projector or the xy laser scanner is required, and for this purpose, a highly accurate correction algorithm is to be developed and installed.

The foregoing is intended merely to aid in the understanding of the background of the present invention, and is not intended to mean that the present invention falls within the purview of the related art that is already known to those skilled in the art.

DOCUMENTS OF RELATED ART

[Patent Document] Korean Patent No. 10-1504419

SUMMARY OF THE INVENTION

Accordingly, the present invention has been proposed to solve above problems arising from use of a conventional method, and an objective of the present invention is to provide a three-dimensional printing apparatus using a digital light processing (DLP) projector with a laser scanner capable of manufacturing a large three-dimensional sculpture using only one DLP projector and one 1-axis laser scanner.

In addition, the objective of the present invention is to provide the three-dimensional printing apparatus using the DLP projector with the laser scanner, which is capable of outputting a precise large sculpture quickly and accurately, by providing a core portion corresponding to a rough skeleton of the large three-dimensional sculpture using the DLP projector and a shell portion corresponding to a precise surface of the large three-dimensional sculpture using the 1-axis laser scanner.

In order to achieve the above objective, according to one aspect of the present invention, there is provided the three-dimensional printing apparatus using the DLP projector with the laser scanner, the apparatus including: a resin storage unit storing a photocurable resin; a DLP projector unit disposed above the resin storage unit and projecting light corresponding to a core portion of an axial cross section of a sculpture to the resin storage unit; a molding stage unit provided to be capable of being lifted and lowered in a vertical direction from a bottom of the resin storage unit, wherein the sculpture is formed on an upper side portion thereof; a laser scanner unit disposed above the resin storage unit and performing scanning of light corresponding to a shell portion of the axial cross section of the sculpture for the resin storage unit; a scanner transfer unit supporting and transporting the laser scanner unit, thereby allowing the laser scanner unit to move in an x-axis direction; an image processing unit dividing one sectional image of the sculpture into a core portion and a shell portion; and a controller receiving data on the core portion from the image processing unit, thereby outputting the data on the core portion to the DLP projector unit, receiving data on the shell portion from the image processing unit, on the basis of the data on the shell portion input thereto, controlling the laser scanner unit and the scanner transfer unit, and lifting and lowering the molding stage unit on the basis of data of the sculpture.

In addition, the laser scanner unit may be a galvano mirror scanner.

Meanwhile, the laser scanner unit may be a polygon mirror scanner.

In addition, the laser scanner unit may be a micro-electro-mechanical systems (MEMS) mirror scanner.

Meanwhile, the DLP projector unit may include, a high output UV LED radiating light; a mirror reflecting the light radiated from the high output UV LED; a lens projecting the light reflected from the mirror toward the upper portion of the resin storage unit; and a projector housing accommodating the high output UV LED, the mirror, and the lens.

In addition, the image processing unit may adjust a size of the core portion to include an area overlapping the shell portion by a predetermined thickness along an outline of the core portion.

According to the three-dimensional printing apparatus using the DLP projector with the laser scanner in accordance with the present invention, it is possible to manufacture a large three-dimensional sculpture only using one DLP projector, which is fixed, and one 1-axis laser scanner, which is controlled to be reciprocated in an x-axis direction.

In addition, according to the three-dimensional printing apparatus using the DLP projector with the laser scanner in accordance with the present invention, the core portion, corresponding to the rough skeleton of the large three-dimensional sculpture, is provided using the DLP projector capable of performing a high speed operation, and the shell portion, corresponding to the precise surface of the large three-dimensional sculpture, is provided using the 1-axis laser scanner capable of performing a precise operation, whereby there is an effect to output the precise large sculpture quickly and accurately.

The effects of the present invention are not limited to the above-mentioned effects, and other effects not mentioned will be clearly understood from the following description.

BRIEF DESCRIPTION OF THE DRAWINGS

The above and other objectives, features and other advantages of the present invention will be more clearly understood from the following detailed description when taken in conjunction with the accompanying drawings, in which.

EXPLANATION OF REFERENCE NUMERALS

Figure 1:
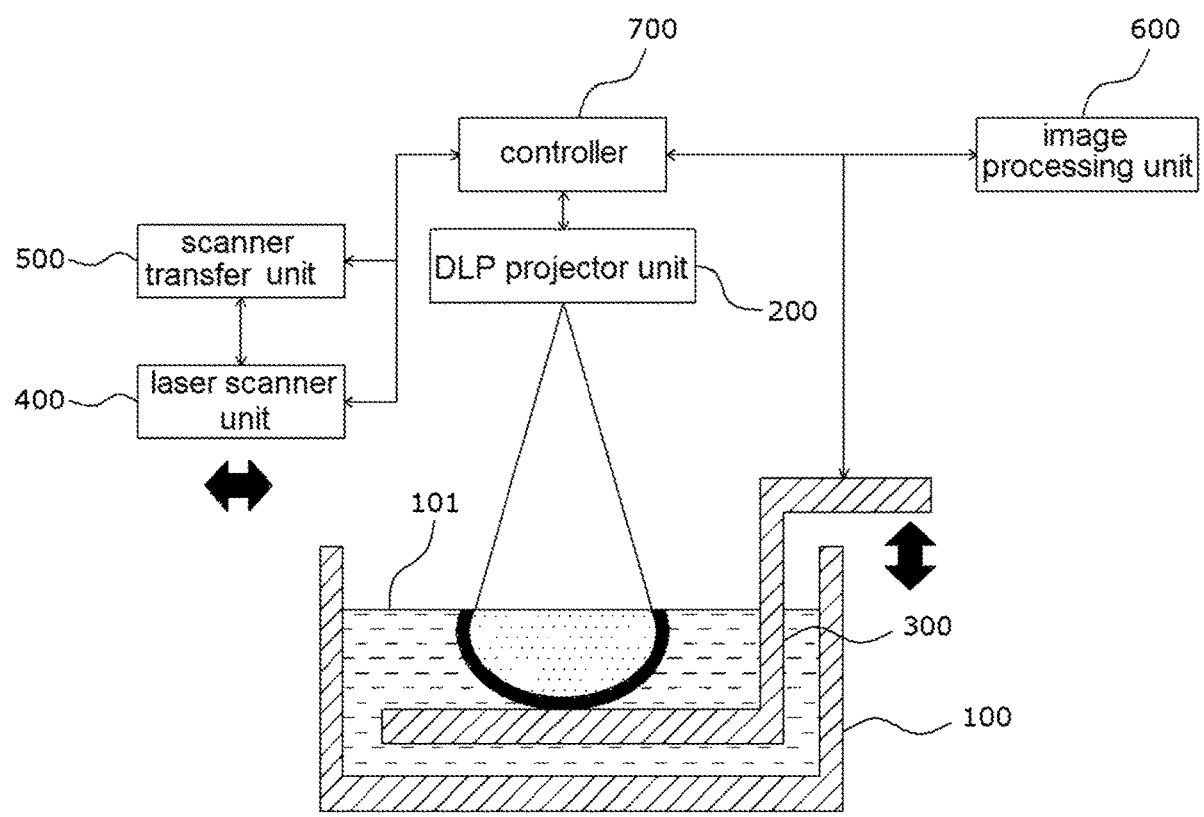
FIG. 1 is a view schematically showing a three-dimensional printing apparatus using a DLP projector with a laser scanner according to the present invention.

100: resin storage unit
200: DLP projector unit
300: molding stage unit
400: laser scanner unit
500: scanner transfer unit
600: image processing unit
700: controller

DETAILED DESCRIPTION OF THE INVENTION

Hereinafter, exemplary embodiments of the present invention will be described with reference to the accompanying drawings. Embodiments of the present invention may be modified in various other forms, and the scope of the present invention is not limited to the embodiments described below. Shapes, sizes, and the like of the elements in the drawings may be exaggerated for clarity, elements denoted by the same reference numerals in the drawings are the same elements.

In addition, throughout the specification, when a part is "connected" to another part, this includes not only a "directly connected" but also an "electrically connected" between other elements in between. In addition, when a part is said to "include" or "be provided with" a certain component, this means that, unless otherwise explicitly stated, it is possible for the part to be provided with or include other components further rather than to exclude other components.

Figure 2:
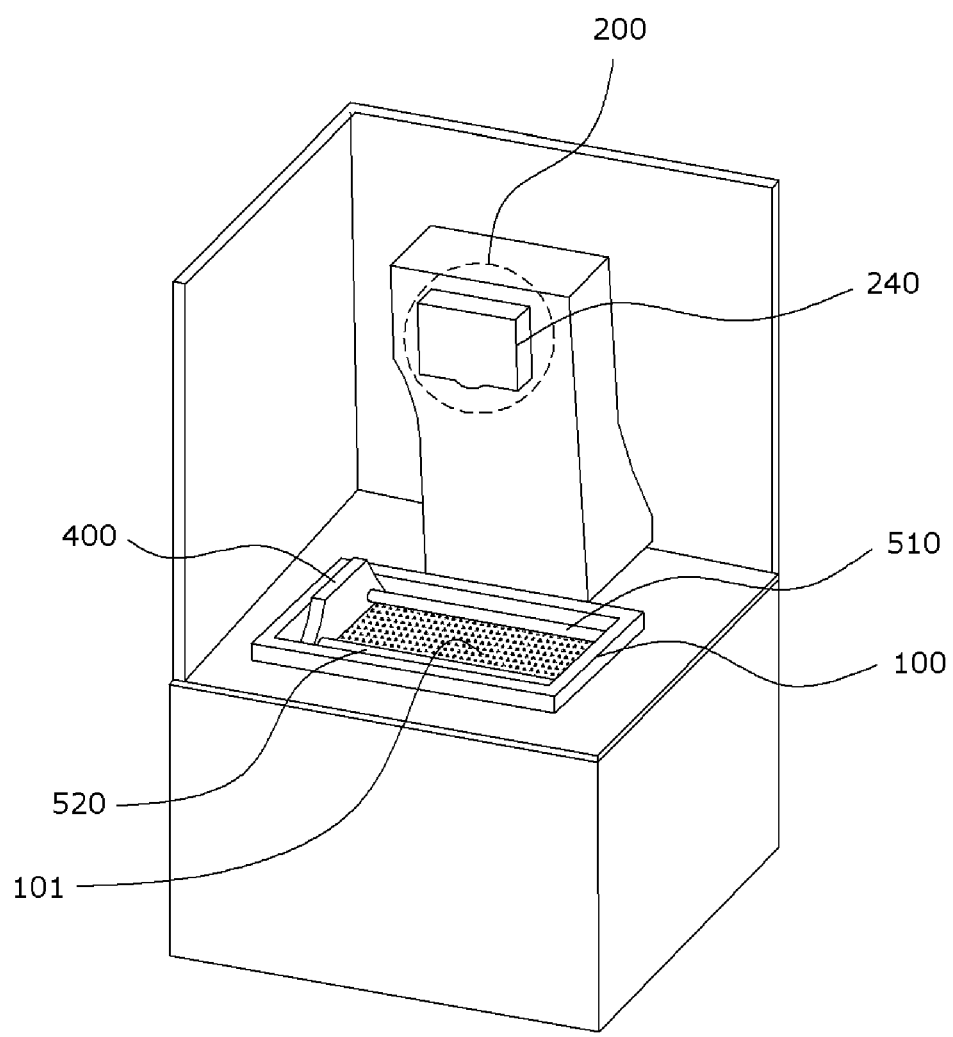
FIG. 2 is a view showing a structure of the three-dimensional printing apparatus using the DLP projector with the laser scanner according to the present invention.

FIGS. 1 and 2 are views showing a three-dimensional printing apparatus using a digital light processing (DLP) projector with a laser scanner according to the present invention, wherein the three-dimensional printing apparatus using the DLP projector with the laser scanner according to the present invention includes a resin storage unit 100, a DLP projector unit 200, a molding stage unit 300, a laser scanner unit 400, a scanner transfer unit 500, an image processing unit 600, and a controller 700.

The resin storage unit 100 stores the photocurable resin 101, and may be a storage pool having a horizontal sectional area of about 400×400 mm$^2$ or more so as to be suitable for forming a large three-dimensional sculpture.

In this case, in order to accurately align focuses of a light projected from the DLP projector unit 200 and a light radiated from the laser scanner unit 400 on a surface of the photocurable resin 101 stored in the resin storage unit 100, an apparatus (not shown) for maintaining a constant height of the surface of the photocurable resin 101 stored in the resin storage unit 100 may be provided. For example, the controller 700 is equipped with a sensor that detects a position of the surface of the photocurable resin 101 and may continuously supply the photocurable resin 101 into the resin storage unit 100 to allow the height of the surface of the photocurable resin 101 stored in the resin storage part 100 to be kept constant or may perform lifting and lowering control of the resin storage unit 100 in which the photocurable resin 101 is accommodated.

The DLP projector unit 200 is disposed above the resin storage unit 100 and projects the light corresponding to the core portion of an axial cross section of the sculpture to the resin storage unit 100. In this case, the DLP projector unit 200 may be disposed in a fixed state at a far distance in comparison with the laser scanner unit 400 upwardly from the resin storage unit 100 in order to cover the entire top surface of the resin storage unit 100 as a single projection area.

The molding stage unit 300 is provided to be capable of being lifted and lowered from a bottom of the resin storage unit 100 in a vertical direction, and a three-dimensional sculpture is molded on an upper side portion thereof. That is, the molding stage 300 is for sequentially curing the photocurable resin 101 into a three-dimensional shape, and is provided to be movable in the height direction of the three-dimensional sculpture under the control of the controller 700. For example, the controller 700 lowers the molding stage part 300 so that the photocuring resin which has a height of about 5 µm may be filled on the bottom surface of the molding stage unit 300. Then, the controller 700, by controlling the DLP projector unit 200 and the laser scanner unit 400, cures the core portion and the shell portion of the cross section of the sculpture on the filled photocuring resin. Then, the controller 700 may lower the molding stage unit 300 so that the photocuring resin which has a height of about 5 µm may be filled again on the cured core portion and the cured shell portion of the cross section of the sculpture. In addition, when the three-dimensional sculpture is completed to be formed on the bottom surface, the molding stage unit 300 may be controlled to be lifted by the controller 700 so that the formed three-dimensional sculpture may be exposed to the outside of the photocurable resin 101.

On the other hand, the molding stage unit 300 may be provided with a soft film and a release film on a bottom surface housing made of a material such as acrylic, thereby allowing the formed three-dimensional sculpture to be separated well from the bottom surface. That is, the molding stage unit 300 is provided with the release film on the surface in contact with the three-dimensional sculpture, whereby the three-dimensional sculpture may be prevented from being fixed on the bottom surface. Accordingly, the three-dimensional sculpture may be prevented from being damaged in the process of removing the formed three-dimensional sculpture from the molding stage unit 300. In addition, the molding stage unit 300 may be provided with a soft film, which is a silicone-based film having a predetermined thickness and elasticity, between the bottom housing and the release film. The above-mentioned soft film may act to buffer between the bottom housing of the molding stage 300 and the three-dimensional sculpture, thereby playing a role in smoothly separating the three-dimensional sculpture without being damaged from the release film.

The laser scanner unit 400 is disposed above the resin storage unit 100, and performs scanning of the light corresponding to the shell portion of the axial cross section (horizontal cross section) of the three-dimensional sculpture for the resin storage unit 100 under the control of the controller 700. In this case, the laser scanner unit 400 may be a galvano mirror scanner, a polygon mirror scanner, or an MEMS mirror scanner, and, as shown in FIG. 2, may be an 1-axis laser scanner that performs a scanning operation in the y-axis direction.

The scanner transfer unit 500 supports and transports the laser scanner unit 400 so that the laser scanner unit 400 moves in the x-axis direction under the control of the controller 700. Here, the scanner transfer unit 500, as shown in FIG. 2, is provided with a first rail 510 and a second rail 520 installed in parallel with each other in the x-axis direction. In addition, the scanner transfer unit 500 may transport the laser scanner unit 400 including various configurations implementing a driving mechanism such as a motor, a gear, a cylinder, and the like from one side up to an opposite side, or vice versa, of the resin storage unit 100.

That is, the laser scanner unit 400 covers the surface of the photocurable resin 101 stored in the resin storage unit 100 in the y-axis direction while adjusting the light irradiation point and, as the scanner transfer unit 500 transports the laser scanner unit 400, becomes to cover the surface of the photocurable resin 101 stored in the resin storage unit 100 in the x-axis direction. Accordingly, it is possible for the laser scanner unit 400 to perform scanning of the light corresponding to the shell portion of the axial cross section of the three-dimensional sculpture even for whichever point of the surface of the photocurable resin 101.

The image processing unit 600 divides one sectional image of the three-dimensional sculpture into a core portion and a shell portion under the control of the controller 700, and outputs the divided images to the controller 700. At this time, the image processing unit 600 may convert a file for outputting a three-dimensional sculpture such as a stereolithography (STL) file into a slicing file such as a G-code file and generate divided images. However, the image processing unit 600 may also receive the slicing file directly and generate the divided images and is not limited thereto. In addition, the image processing unit 600 will be described separately from the controller 700 for convenience, but may also be a type integrated with the controller 700 in software-wise or hardware-wise type.

Figure 3A:
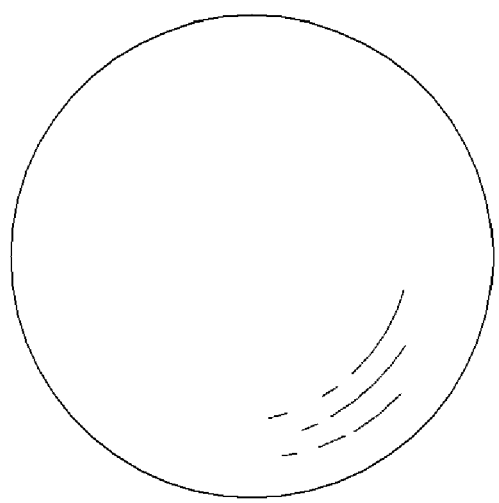
FIG. 3A is a view showing an example of a three-dimensional sculpture output by the three-dimensional printing apparatus using the DLP projector with the laser scanner according to the present invention.
Figure 3B:
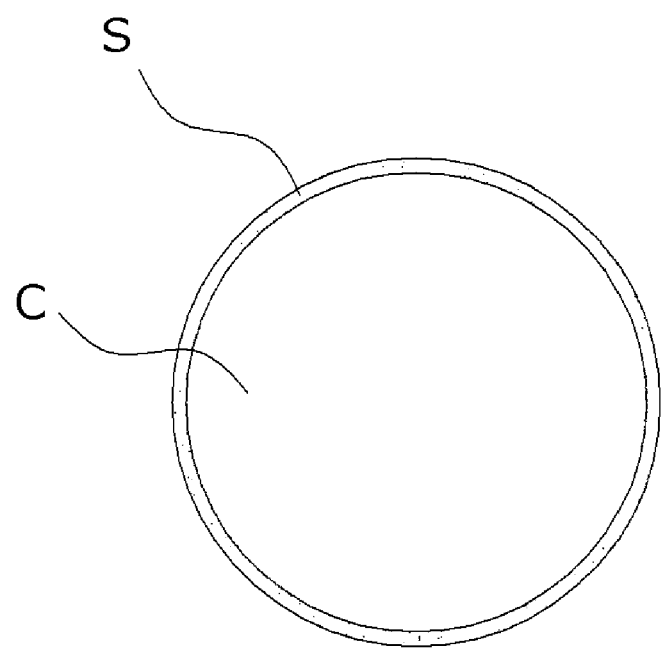
FIGS. 3B and 3C are views illustrating axial sectional views for outputting the three-dimensional sculpture shown in FIG. 3A.
Figure 3C:
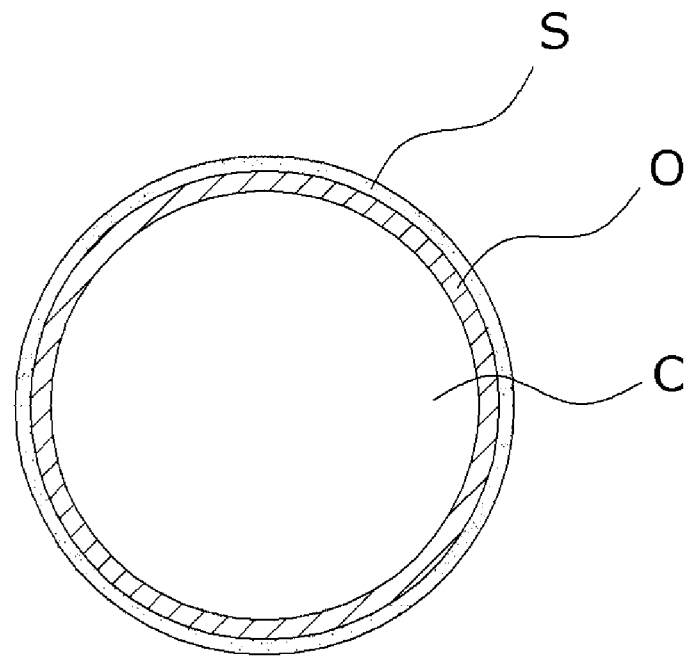

FIGS. 3A to 3C are views showing an image of a sphere that may be output by the three-dimensional printing apparatus using the DLP projector with the laser scanner of the present invention and images obtained by dividing one sectional image of the sphere of FIG. 3A into a core portion and a shell portion by the image processing unit 600.

For example, when the three-dimensional sculpture to be output is a sphere as shown in FIG. 3A, for one sectional image, C+S, of the sphere, the image processing unit 600 generates divided data for a shell portion S and a core portion C, wherein the shell portion S is an outside portion having a predetermined thickness and needing precise curing and the core portion C is a portion excluding the shell portion. In addition, the image processing unit 600 may output the generated data to the controller 700.

Subsequently, the controller 700 controls the DLP projector unit 200 using the data on the core portion C, thereby allowing the DLP projector unit 200 to project the light corresponding to the core portion of the axial cross section of the three-dimensional sculpture to the resin storage unit 100. That is, the controller 700 recognizes each coordinate of a horizontal cross section for forming a three-dimensional structure through a G-code and the like, which a graphic file stored in an STL format is sliced and, according to the recognized coordinates, may control the shape of the light to be projected by the DLP projector unit 200.

Through the above-described process, the photocurable resin 101 is cured at high speed to a height of about 5 µm in a shape of the core portion C of the sphere by the light projected by the DLP projector unit 200. At this time, the surface of the cured core portion C may not be precise and somewhat roughened.

Next, the controller 700 controls the laser scanner unit 400 using the data on the shell portion S, thereby allowing the laser scanner unit 400 to perform scanning of the laser corresponding to the shell portion of the axial cross section of the three-dimensional sculpture for the resin storage unit 100. That is, the controller 700 recognizes each coordinate of the horizontal cross section for forming a three-dimensional structure through a G-code and the like, which a graphic file stored in an STL format is sliced and, according to the recognized coordinates, may control the path of the light to be radiated by the laser scanner unit 400.

Through the above-described process, the photocurable resin 101 is precisely cured to a height of about 5 µm in a shape of the shell portion S of the sphere by the light radiated by the laser scanner unit 400. At this time, the laser scanner unit 400 needs to cure the outermost surface of the three-dimensional sculpture precisely and thus the scanning speed of the light may be somewhat slow. However, unlike the conventional three-dimensional printer using only a galvano scanner and the like, because only the shell portion S corresponding to a thin outermost part needs to be cured in a state where the core portion C has been cured in advance, the working time may be drastically shortened compared with the time required for the conventional method of curing one whole cross section of the sphere.

On the other hand, for one sectional image of the sphere, when generating divided data for the shell portion S and the core portion C, wherein the shell portion S is the outside portion having the predetermined thickness and needing the precise curing and the core portion C is the portion excluding the shell portion, the image processing unit 600 may set an overlap O portion so that the shell portion S and the core portion C may be slightly overlapped at an interface thereof. In this case, the data on the shell portion provided by the image processing unit 600 may be the data of a portion S+O obtained by adding the shell portion and the overlap portion of FIG. 3C, and the data on the core portion provided by the image processing unit 600 may be the data of a portion C+O obtained by adding the core portion and the overlap portion of FIG. 3C.

That is, the image processing unit 600 may adjust, for example, to increase, the size of the core portion to include an area overlapping the shell portion by a predetermined thickness along an outline of the core portion. Through this, the interface between the shell portion and the core portion may be solidly cured, which in turn may improve the strength of the formed three-dimensional sculpture.

Figure 4A:
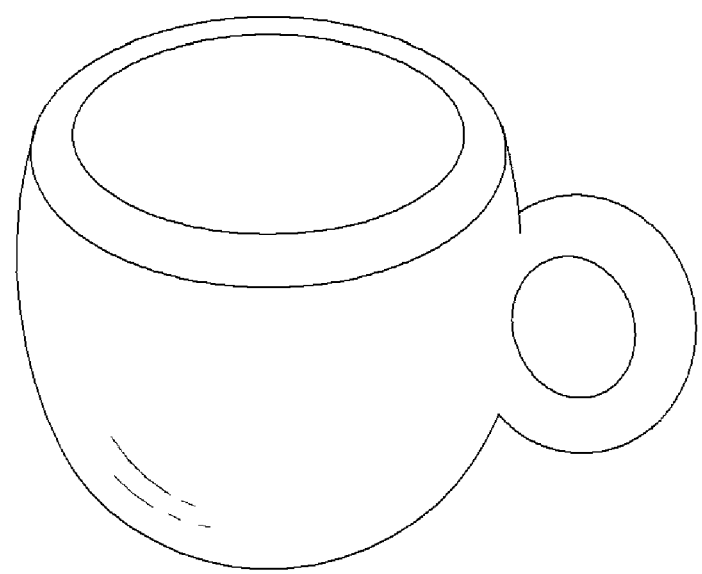
FIG. 4A is a view illustrating an example of a three-dimensional sculpture output by the three-dimensional printing apparatus using the DLP projector with the laser scanner according to the present invention.
Figure 4B:
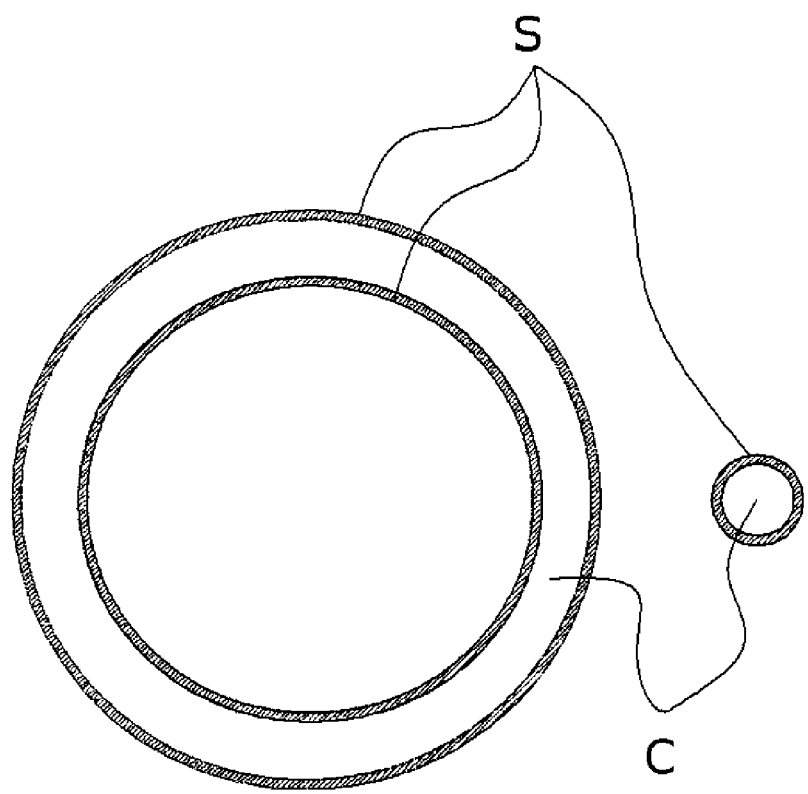
FIG. 4B is a view showing an axial cross section for outputting the three-dimensional sculpture shown in FIG. 4A.

FIGS. 4A and 4B are views showing an image of a cup that may be output by the three-dimensional printing apparatus using the DLP projector with the laser scanner of the present invention and an image obtained by dividing one sectional image of the cup of FIG. 4A into a core portion and a shell portion by the image processing unit 600, respectively. That is, according to the three-dimensional printing apparatus of the present invention, by adjusting the shape of the core portion C and the shell portion S, it is possible to accurately and quickly output various three-dimensional sculptures. In addition, even when outputting a three-dimensional sculpture in a shape of the cup as shown in FIG. 4A, the same as shown in FIG. 3C, by setting the overlap O portion such that the shell portion S and the core portion C may be slightly overlapped at an interface thereof, the solidity of the output three-dimensional output may be improved.

The controller 700 receives data on the core portion from the image processing unit 600, thereby outputting the data on the core portion to the DLP projector unit 200; receives data on the shell portion from the image processing unit 600, thereby, on the basis of the data on the shell portion input thereto, controlling the laser scanner unit 400 and the scanner transfer unit 500; and lifts and lowers the molding stage unit 300 on the basis of data on the sculpture. At this time, because the DLP projector unit 200 is fixed, when controlling the DLP projector unit 200, the controller 700 does not need to perform any separate control operation associated with alignment other than to output data on the core portion to the DLP projector unit 200. In addition, when the laser scanner unit 400 is the 1-axis laser scanner, the controller 700 extracts a y-axis coordinate value for radiating light on the basis of the data on the shell portion, and then transfers the extracted value to the laser scanner unit 400. Subsequently, the controller 700 controls the scanner transfer unit 500 so that the laser scanner unit 400 moves stepwise by a predetermined distance in the x-axis direction. Thus, the controller 700 does not need to perform any separate control operation associated with an alignment as well.

Figure 5:
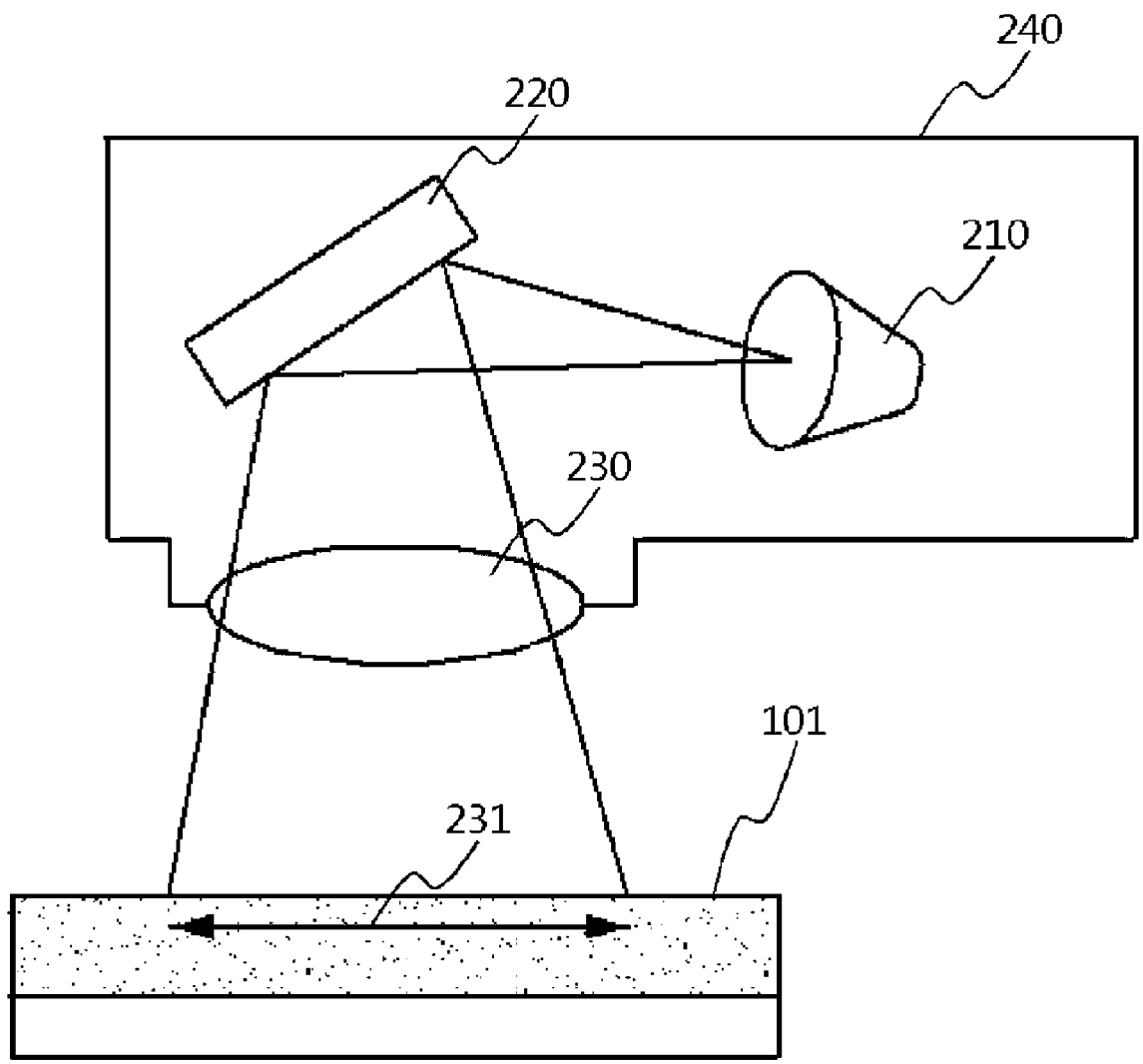
FIG. 5 is a diagram illustrating an example of the DLP projector shown in FIGS. 1 and 2.

FIG. 5 is a diagram schematically illustrating an example of the DLP projector 200 shown in FIGS. 1 and 2, and the DLP projector unit 200 may include a high output ultraviolet light emitting diode (UV LED) 210, a mirror 220, a lens 230, and a projector housing 240.

The high output UV LED 210 generates ultraviolet light, thereby radiating the ultraviolet light toward the mirror 220.

Here, the high output UV LED 210 may have a light output reaching about 560 mW when about 500 mA of current is supplied.

The mirror 220 reflects the light radiated from the high output UV LED 210 toward the lens 230. Although schematically illustrated in FIG. 5, the mirror 220 may be a digital micromirror device (DMD) chip, that is, a semiconductor optical switching chip with integrated micro mirrors.

The lens 230 projects the light reflected from the mirror toward the upper portion of the resin storage unit 100, that is, the surface of the photocurable resin 101.

The projector housing 240 accommodates the high output UV LED 210, the mirror 220, and the lens 230 therein and may provide a predetermined coupling structure that allows the DLP projector unit 200 to be fixedly disposed above the resin storage unit 100. In this case, the protector housing 240 may be installed at a height, above the resin storage part 100, at which the irradiation range 231 of the lens 230 may cover the entire upper part of the resin storage part 100.

Figure 6:
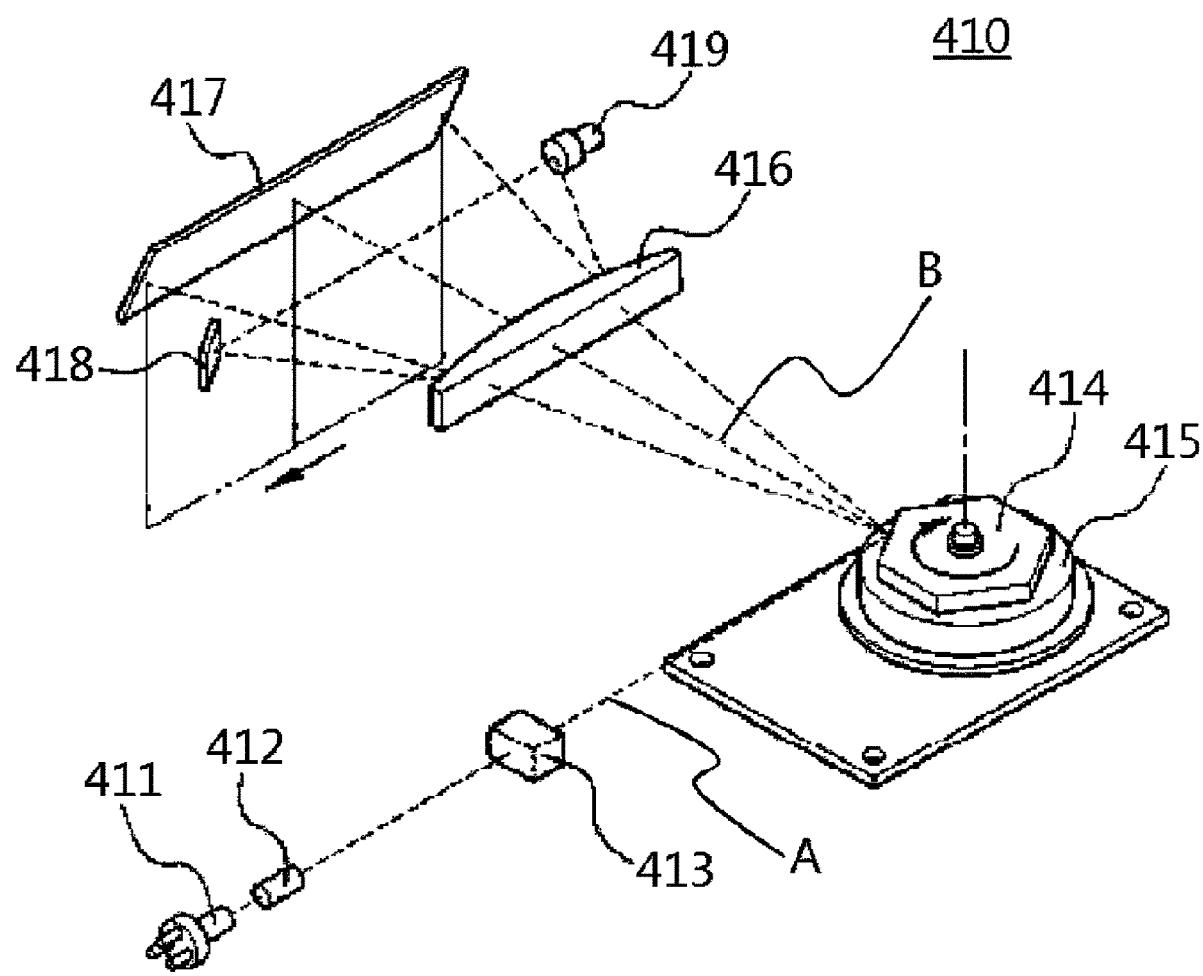
FIG. 6 is a diagram illustrating a case where the laser scanner unit shown in FIGS. 1 and 2 is a polygon mirror scanner.

FIG. 6 is a diagram illustrating a polygon mirror scanner 410 that is an example of the laser scanner unit 400 shown in FIGS. 1 and 2. Here, the polygon mirror scanner 410 of the present invention includes a laser diode 411, a collimating lens 412 that makes the laser light radiated from the laser diode 411 into parallel light or convergent light with respect to the optical axis, a cylinder lens 413 linearly forming the laser light passing through the collimating lens 412 in an image in a horizontal direction, a polygon mirror driving motor 415 rotating the polygon mirror 414 at constant speed, an f-theta f-θ lens 416, having a constant refractive index with respect to the optical axis, polarizing the light at the constant speed reflected in the polygon mirror 414 in a main scanning direction and correcting aberration thereof, thereby focusing the light on the scanning surface, an image forming reflective mirror 417 reflecting the laser light passing through the f-θ lens 416 in a predetermined direction, thereby forming an image in a point shape on the surface of the photocurable resin, which is an image plane, a synchronization detection sensor 419 for receiving the laser light, thereby matching horizontal synchronization, and a reflection mirror 418 for synchronization signal detection reflecting the laser light toward a side of the synchronization detection sensor. The above-mentioned components are typically assembled on one frame, thereby composing the polygon mirror scanner 410.

The operation of the polygon mirror scanner 410 having the above-described configuration will be described below. First, a signal corresponding to the shell portion of the axial cross section of the three-dimensional sculpture to be scanned is applied to a laser diode 411 by the controller 700, and the laser diode 411 is turned on/off according to the signal of the controller 700. In addition, the laser light emitted from the laser diode 411 passes through a collimating lens 412 and a cylinder lens 413 and is shaped into a predetermined beam A. Then, scanning of the shaped laser light is performed in a light radiation direction parallel to a rotating plane of the polygon mirror. Above-mentioned scanning light is, of course, diffused by the f-θ lens 416 and reflected by the image forming reflective mirror 417, and then formed into an image of a prescribed size on the surface of the photocurable resin. When the scanning of irradiation of the first line by light is completed in the y-axis direction, the scanner transfer unit 500, under the control of the controller 700, transports the polygon mirror scanner 410 at a predetermined speed by a distance corresponding to the resolution of the polygon mirror scanner 410. Then, the polygon mirror scanner 410 performs scanning of irradiation of a second line by light, which is a next line of the first line, in a similar manner to a scanning process of the irradiation of the first line by the light described above. In addition, the above-described process is repeated until the output of the three-dimensional sculpture is completed.

Figure 7:
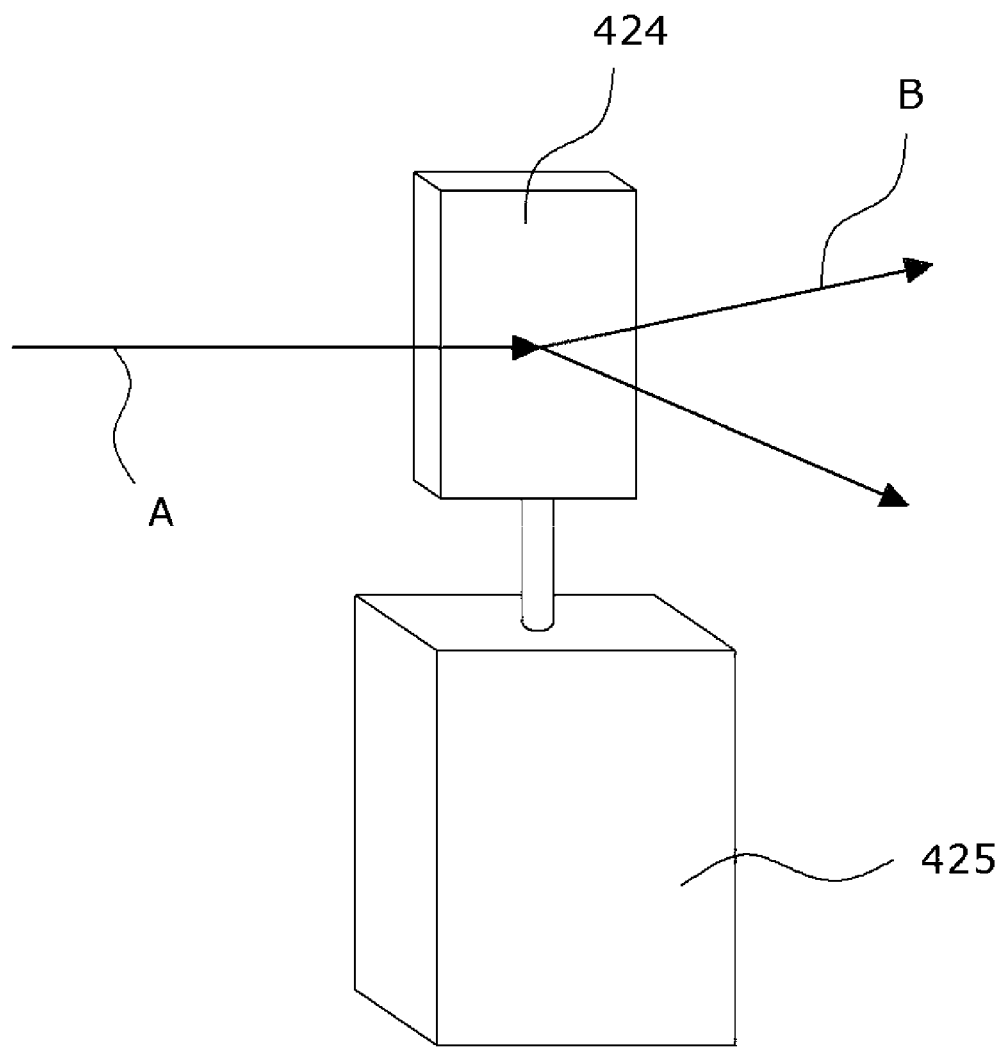
FIG. 7 is a diagram illustrating a galvano mirror and a galvano mirror driving unit of a galvano mirror scanner applied to the laser scanner unit shown in FIGS. 1 and 2.

In addition, the polygon mirror 414 and the polygon mirror driving motor 415 are for polarizing the laser light. As shown in FIG. 7, instead of the polygon mirror 414 and the polygon mirror driving motor 415, a galvano mirror scanner using a galvano mirror 424 and a galvano mirror driving motor 425 may be used, or an MEMS mirror scanner using the aforementioned DMD chip (not shown) may be used, but is not limited thereto.

Figure 8:
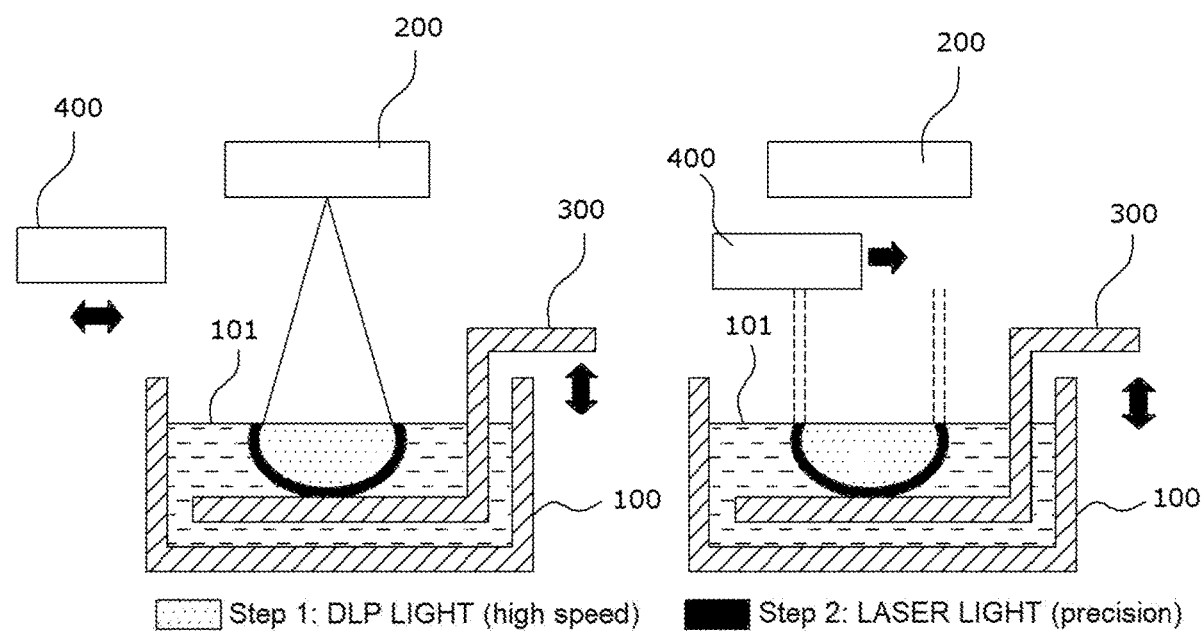
FIG. 8 is a view explaining an operation of the three-dimensional printing apparatus using the DLP projector with the laser scanner according to the present invention.

FIG. 8 is a view explaining an operation of the three-dimensional printing apparatus using the DLP projector with the laser scanner according to the present invention. With reference to FIGS. 1 to 8, the operation of the three-dimensional printing apparatus using the DLP projector with the laser scanner of the present invention will be described below.

First, the controller 700 lowers the molding stage unit 300 so that the photocurable resin 101 having a height of about 5 μm is filled on the core portion and the shell portion of the cross section of the cured sculpture.

Next, the controller 700 receives data on the core portion from the image processing unit 600 and outputs the data to the DLP projector unit 200. Here, the DLP projector unit 200 projects the light corresponding to the core portion of the axial cross section of the sculpture to the resin storage unit 100 under the control of the controller 700 (a high speed photocuring process in step 1).

Subsequently, the controller 700 controls the laser scanner unit 400 using the data on the shell portion so that the scanning of the laser corresponding to the shell portion of the axial cross section of the three-dimensional sculpture is performed for the resin storage unit 100 (a precision photocuring process in step 2). Here, the controller 700 extracts the y-axis coordinate value for radiating light on the basis of the data on the shell portion and then transfers the extracted value to the laser scanner unit 400, thereby allowing laser scanning operations to be performed on a y-axis line basis by the laser scanner unit 400. That is, when the scanning is performed and completed for one line by the laser scanner unit 400, the controller 700 controls the scanner transfer unit 500 to move the laser scanner unit 400 in the x-axis direction by a predetermined distance, for example, corresponding to the thickness of one line. Subsequently, the controller 700 allows the precision scanning operation to proceed in a manner of controlling to allow the scanning for the next line to be performed by the laser scanner unit 400 again.

When the photocuring operation on one axial cross section of the three-dimensional sculpture is completed, the controller 700 may lower the molding stage 300 so that the photocuring resin 101 having a height of about 5 μm is placed again on the core portion and the shell portion of the cross section of the cured sculpture and may control above-described processes to be repeated until the three-dimensional sculpture is entirely completed.

As mentioned above, the conventional three-dimensional printer uses a plurality of DLP or xy laser scanning engines to output the large three-dimensional sculpture. Accordingly, the conventional three-dimensional printer is required to be equipped with a correction algorithm with a high difficulty to perform tilt, position, and size correction of each projected image.

However, according to the apparatus of the present invention described above, it is possible to output a large three-dimensional sculpture quickly and precisely using one DLP projector and one 1-axis laser scanner without a correction algorithm.

Thus far the present invention has been described focusing on the exemplary embodiments. Those skilled in the art will appreciate that the present invention may be implemented in a modified form without departing from the essential features of the present invention. Therefore, the disclosed embodiments should be considered in a descriptive sense only and not to be a limitation. The scope of the present invention is shown in the claims rather than the foregoing description, and all differences within the equivalent scope thereof will be construed as being included in the present invention.

What is claimed is:

1. A three-dimensional printing apparatus using a digital light processing (DLP) projector with a laser scanner, the apparatus comprising:
    a resin storage unit storing a photocurable resin;
    a DLP projector unit disposed above the resin storage unit and projecting light corresponding to a core portion of an axial cross section of a sculpture to the resin storage unit;
    a molding stage unit provided to be capable of being lifted and lowered in a vertical direction from a bottom of the resin storage unit, wherein the sculpture is formed on an upper side portion thereof;
    a laser scanner unit disposed above the resin storage unit and performing scanning of light corresponding to a shell portion of the axial cross section of the sculpture for the resin storage unit in a y-axis direction;
    a scanner transfer unit supporting and transporting the laser scanner unit, thereby allowing the laser scanner unit to move in an x-axis direction;
    an image processing unit dividing one sectional image of the sculpture into the core portion and the shell portion; and
    a controller receiving data on the core portion from the image processing unit, thereby outputting the data on the core portion to the DLP projector unit, receiving data on the shell portion from the image processing unit, on the basis of the data on the shell portion input thereto, controlling the laser scanner unit and the scanner transfer unit, and lifting and lowering the molding stage unit on the basis of data of the sculpture,
    wherein the image processing unit sets an overlap portion so that the shell portion and the core portion are slightly overlapped at an interface thereof, and
    wherein the data on the shell portion is obtained by adding the shell portion and the overlap portion, and the data on the core portion is obtained by adding the core portion and the overlap portion.

2. The three-dimensional printing apparatus of claim 1, wherein the laser scanner unit is a galvano mirror scanner.

3. The three-dimensional printing apparatus of claim 1, wherein the laser scanner unit is a polygon mirror scanner.

4. The three-dimensional printing apparatus of claim 1, wherein the laser scanner unit is a micro-electro-mechanical systems (MEMS) mirror scanner.

5. The three-dimensional printing apparatus of claim 1, wherein the DLP projector unit includes,
    a high output UV LED radiating light;
    a mirror reflecting the light radiated from the high output UV LED;
    a lens projecting the light reflected from the mirror toward the upper portion of the resin storage unit; and a projector housing accommodating the high output UV LED, the mirror, and the lens.

6. The three-dimensional printing apparatus of claim 1, wherein the image processing unit adjusts a size of the core portion to include an area overlapping the shell portion by a predetermined thickness along an outline of the core portion.

* * * * *